United States Patent
Gruner et al.

(10) Patent No.: US 7,934,198 B2
(45) Date of Patent: Apr. 26, 2011

(54) PREFIX MATCHING STRUCTURE AND METHOD FOR FAST PACKET SWITCHING

(75) Inventors: Frederick R. Gruner, Palo Alto, CA (US); Gaurav Singh, Santa Clara, CA (US); Elango Ganesan, Palo Alto, CA (US); Samir C. Vora, Milpitas, CA (US); Christopher M. Eccles, San Francisco, CA (US); Brian Hang Wai Yang, Monterey Park, CA (US)

(73) Assignee: NetLogic Microsystems, Inc., Santa Clara, CA (US)

( * ) Notice: Subject to any disclaimer, the term of this patent is extended or adjusted under 35 U.S.C. 154(b) by 1860 days.

(21) Appl. No.: 10/968,460

(22) Filed: Oct. 18, 2004

(65) Prior Publication Data
US 2005/0122972 A1 Jun. 9, 2005

Related U.S. Application Data

(60) Provisional application No. 60/512,121, filed on Oct. 17, 2003.

(51) Int. Cl.
*G06F 9/44* (2006.01)
*H04L 12/28* (2006.01)

(52) U.S. Cl. .......................... 717/121; 717/104; 370/351

(58) Field of Classification Search .................. None
See application file for complete search history.

(56) References Cited

U.S. PATENT DOCUMENTS

| | | | |
|---|---|---|---|
| 6,035,414 A * | 3/2000 | Okazawa et al. .................. 714/7 |
| 6,081,440 A | 6/2000 | Washburn et al. .............. 365/49 |
| 6,237,061 B1 | 5/2001 | Srinivasan et al. ............ 711/108 |
| 6,324,087 B1 | 11/2001 | Pereira ............................. 365/49 |
| 6,460,112 B1 | 10/2002 | Srinivasan et al. ............ 711/108 |
| 6,499,081 B1 | 12/2002 | Nataraj et al. ................. 711/108 |
| 6,505,270 B1 | 1/2003 | Voelkel et al. ................ 711/108 |
| 6,542,391 B2 | 4/2003 | Pereira et al. .................... 365/49 |
| 6,687,785 B1 | 2/2004 | Pereira ........................... 711/108 |
| 6,751,701 B1 | 6/2004 | Pereira ........................... 711/108 |
| 6,795,892 B1 | 9/2004 | Pereira et al. ................. 711/108 |
| 6,799,243 B1 | 9/2004 | Pereira et al. ................. 711/108 |
| 6,801,981 B1 | 10/2004 | Pereira et al. ................. 711/108 |
| 6,813,680 B1 | 11/2004 | Pereira ........................... 711/108 |

(Continued)

OTHER PUBLICATIONS

"Longest prefix matching using bloom filters", Dharmapurikar et al., Aug. 2003, pp. 201-212, <http://delivery.acm.org/10.1145/870000/863979/p201 -dharmapurikar.pdf>.*

(Continued)

*Primary Examiner* — Thuy Dao
(74) *Attorney, Agent, or Firm* — Vista IP Law Group LLP

(57) ABSTRACT

A prefix matching apparatus for directing information to a destination port includes a memory configured to store a piece of data including an address and a plurality of levels each including a plurality of memory locations, the levels each representing a unique address space. A controller is coupled to the memory and to the plurality of levels, and is configured to read the data address and to direct the data to the next level associated with a unique address space associated with the data address. In one embodiment, the controller is configured to match the data address prefix to a plurality of addresses associated with the unique address spaces. Advantages of the invention include fast switch decisions and low switch latency.

18 Claims, 4 Drawing Sheets

U.S. PATENT DOCUMENTS

| | | | | |
|---|---|---|---|---|
| 6,892,272 | B1 | 5/2005 | Srinivasan et al. | 711/108 |
| 6,934,795 | B2 | 8/2005 | Nataraj et al. | 711/108 |
| 6,963,924 | B1 * | 11/2005 | Huang et al. | 709/238 |
| 7,050,317 | B1 | 5/2006 | Lien et al. | 365/49 |
| 7,099,276 | B1 * | 8/2006 | Kalkunte et al. | 370/230.1 |
| 7,110,407 | B1 | 9/2006 | Khanna | 370/392 |
| 7,174,441 | B2 | 2/2007 | Singh et al. | 711/206 |
| 7,181,742 | B2 * | 2/2007 | Hooper | 718/100 |
| 7,246,198 | B2 | 7/2007 | Nataraj et al. | 711/108 |
| 7,280,752 | B2 * | 10/2007 | Karuppiah | 396/238 |
| 7,603,346 | B1 | 10/2009 | Depelteau et al. | 707/9 |
| 7,624,226 | B1 | 11/2009 | Venkatachary et al. | 711/108 |
| 7,643,353 | B1 | 1/2010 | Srinivasan et al. | 365/49.17 |
| 7,653,619 | B1 | 1/2010 | Depelteau et al. | 707/3 |
| 7,660,140 | B1 | 2/2010 | Joshi et al. | 365/49.17 |
| 7,747,599 | B1 | 6/2010 | Depelteau et al. | 707/706 |
| 7,808,971 | B2 * | 10/2010 | Miller | 370/351 |
| 2004/0105422 | A1 * | 6/2004 | Sahni et al. | 370/351 |
| 2004/0114568 | A1 * | 6/2004 | Beverly | 370/351 |
| 2004/0179526 | A1 * | 9/2004 | Cypher | 370/392 |
| 2005/0041634 | A1 * | 2/2005 | Aura | 370/351 |
| 2006/0013193 | A1 * | 1/2006 | Kim et al. | 370/351 |
| 2008/0049717 | A1 * | 2/2008 | Jamieson et al. | 370/351 |
| 2008/0275872 | A1 | 11/2008 | Venkatachary et al. | 707/101 |
| 2010/0054013 | A1 | 3/2010 | Joshi et al. | 365/49.17 |

OTHER PUBLICATIONS

"Observed structure of addresses in IP traffic", Kohler et al., Nov. 2002, pp. 253-266, <http://delivery.acm.org/10.1145/640000/637242/p253-kohler.pdf>.*

"Scalable high-speed prefix matching", Waldvogel et al., Nov. 2001, pp. 440-482, <http://delivery.acm.org/10.1145/510000/502914/p440-waldvogel.pdf>.*

* cited by examiner

PREFIX MATCHING STRUCTURE AND METHOD FOR FAST PACKET SWITCHING

RELATED APPLICATIONS

This application claims priority to Prov. No. 60/512,121 filed Oct. 17, 2003, incorporated herein by reference.

FIELD

The present invention relates to the field of telecommunications, and more particularly to a prefix matching structure and method for fast packet switching. In one embodiment, the invention is directed to a longest prefix matching structure and method for fast packet switching.

BACKGROUND

Computer networking and communications are important aspects of daily life. These products and services are the infrastructure through which the Internet operates. The universal benefits of the Internet are well known, enabling immediate worldwide sharing of news and events, access to in-depth research on virtually any topic, sophisticated financial analysis available to all, the convenience of e-commerce available on virtually any product to consumers and the emerging capabilities for commercial e-commerce, and the outsourcing enabled by Application Service Providers and Storage Area Networks, to list just a few of the world-changing available uses.

This explosive growth in network traffic is further demonstrated by forecasts made by many leading networking industry experts regarding scaling specific infrastructure areas. Every aspect of these scaling estimates represents requirements for network equipment to scale to provide the necessary bandwidth.

Telecommunications switches and routing help to meet the needs of many devices to connect to a network and then for the network to communicate with other networks. The increasing demands of Internet traffic require equipment suppliers to develop faster and more efficient techniques for routing traffic. Inside the routers are switches that decode addresses associated with data packets and then direct the data packets to the proper ports. The invention is one such technique for improving switching.

SUMMARY OF INVENTION

The invention provides a prefix matching structure and method for fast packet switching. The invention matched the address in the data to those available in a number of layers. A pipelined technique ensures that a new packet is switched to the correct port in a steady and quick manner.

A prefix matching apparatus for directing information to a destination port includes a memory configured to store a piece of data including an address and a plurality of levels each including a plurality of memory locations, the levels each representing a unique address space. A controller is coupled to the memory and to the plurality of levels, and is configured to read the data address and to direct the data to the next level associated with a unique address space associated with the data address. In one embodiment, the controller is configured to match the data address prefix to a plurality of addresses associated with the unique address spaces. In one embodiment, the invention is directed to a longest prefix matching structure and method for fast packet switching.

Advantages of the invention include fast switch decisions and low switch latency.

BRIEF DESCRIPTION OF THE FIGURES

The present invention is illustrated by way of example, and not by way of limitation, in the figures of the accompanying drawings and in which like reference numerals refer to similar elements and in which.

DETAILED DESCRIPTION

The invention is described with reference to specific architectures and protocols. Those skilled in the art will recognize that the description is for illustration and to provide the best mode of practicing the invention. The description is not meant to be limiting. For example, reference is made to Ethernet Protocol but other protocols can be used in the invention. Likewise, reference is made to packets and cells, while other forms of data and addresses can be used in the invention.

A longest prefix matching method works by expanding address prefixes into specific ranges. Then, the method performs a binary search of the sorted list of numbers, which constitute the address spaces. An exemplary architecture is described and then the method if described using that architecture.

A. Architecture

Figure 1:
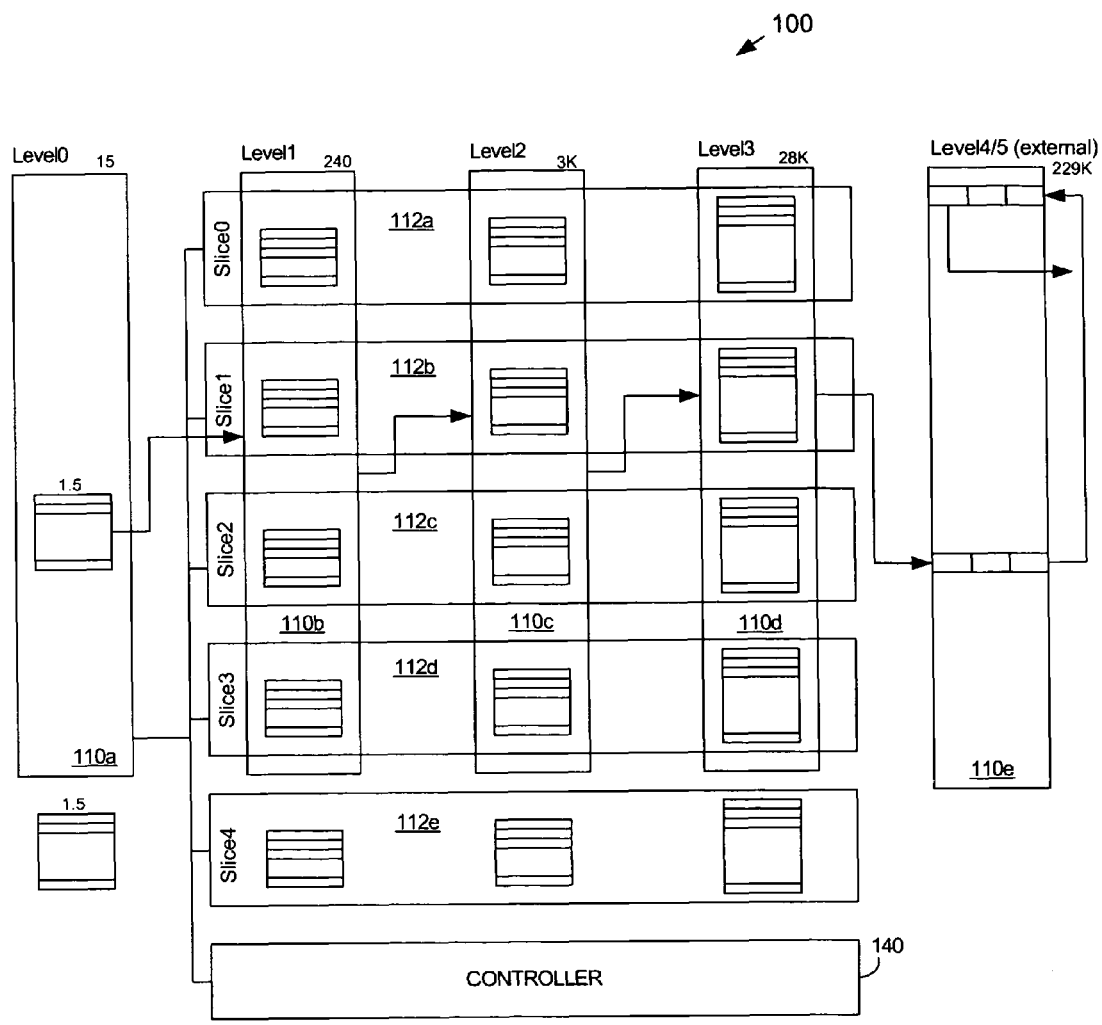
FIG. 1 depicts an exemplary architecture according to an embodiment of the invention.

FIG. 1 depicts an exemplary architecture according to an embodiment of the invention. As shown, the invention includes a number of levels Level0-Level3 (110a-110d) and has access to external levels. There are also several slices shown as Slice0-Slice4 (112a-112e). These slices overlay the levels to the extent that the address spaces described below overlap. A controller 140 manages the operation. In the exemplary embodiment, the controller includes a map or equation representing the index, for example, as graphically depicted in FIGS. 2A-B. By storing the index, the invention can operate deterministically in a highly efficient manner with low latency.

The invention employs a pipelined data path approach to processing the data. In each level, the data address is compared to the available address spaces and is forwarded to the slice with the matching address space. Each of the levels contains four decisions, but more or less decisions could be implemented. Consequently, the pipelined approach that enables a new output every four cycles. The pipelined architecture supports multiple searches simultaneously. The deterministic aspect of the index provides the invention to infer the next level from the index of the current level and the result of the compare operation. This avoids having to store the index in the memory, thereby reducing implementation size.

Each of the slices has a predetermined address space associated with the slice. The address space definitions can be stored locally or stored in external memory, and they are arbitrary (i.e. they don't need to be contiguous or in order). As the data proceeds through the levels, the address is compared to the address space for the next level slice and the controller directs the data based on the index. Since the exemplary embodiment employs a random access memory (RAM), the invention is more efficient than conventional prefix matching techniques that use ternary content addressable memory (TCAM). The invention can achieve a high degree of utilization with the benefits of low power and many stored addresses. In one aspect, the invention can achieve an optimal ratio of addresses to storage approaching 1:1, which is significantly better than conventional techniques.

The search is divided into multiple levels to utilize the pipeline. The number of entries in each level is calculated according to Table 1. A multiplier is chosen at each stage. This is used to tradeoff the number of routes to be supported to the number of accesses needed. For example, a multiplier of 15 means 4 internal accesses at the next level while a multiplier of 7 means 3 accesses.

TABLE 1

| Parameter | Level0 | Level1 Internal | Level2 | Level3 | Level4 External | Level5 |
|---|---|---|---|---|---|---|
| Multiplier (number of accesses) |  | 15(4) | 15(4) | 7(3) | 7(3) | 7(3) |
| Number of Entries | 15 | 240 | 3840 | 28672 | 229376 | 786432 |
| Cummulative Number of Worst Case Routes |  | 128 | 2 K | 16 K | 128 K | 512 K |

When using internal memory only, the search is performed on the four slices as shown 112a-112d. The database, which is a binary tree, is programmed into the four slices. Each level needs a maximum of four lookups. This allows the system to pipeline the lookups and perform the search linearly.

The fifth slice 112e is used as a shadow copy for software to program the device. Insertions and deletions are performed by re-calculating the new database and programming it into the shadow slice. Then the original slice is replaced with the new slice. The original slice now becomes the shadow copy and may be reprogrammed or otherwise utilized as permitted by the controller 140. The shadow slice can be reprogrammed or otherwise utilized simultaneously with operation of the active slices.

B. Operation

Figure 2A:
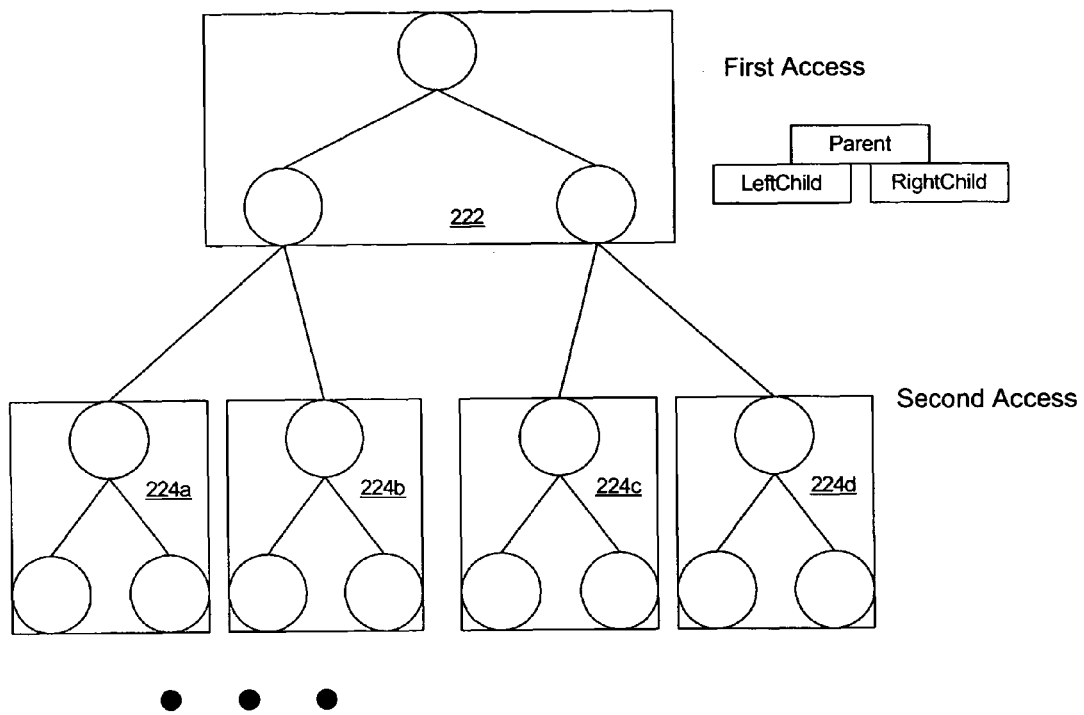
FIGS. 2A-C depicts exemplary tree structures used to describe the invention.
Figure 2B:
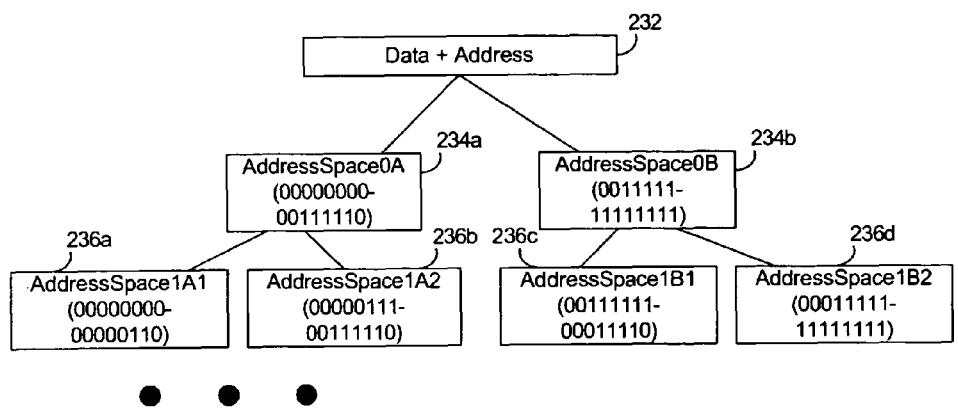

FIGS. 2A depicts an exemplary decision tree according to the invention. The boxes 222 and 224a-224d represent levels in the tree. Each of the circles represents an address space that a new piece of data could be associated with. As the data moves down through the tree, the data is directed to matching address spaces. Likewise, FIG. 2B depicts how a level can be divided into an address space 0A and an address space 0B. The initial decision block 232 would cause data within the address space of 0A (00000000-00111110) to be routed to the slice associated with reference 234a and data within the address space of 0B (0011111-11111111) to be routed to the slice associated with reference 234b, which address space would cause data with the first four symbols of 1111 to be directed to the slice associated with the reference 234b. This is how the controller directs the data to the slices in FIG. 1. Since, the exemplary controller includes a map or equation representing the index, the controller can operate deterministically in a highly efficient manner with low latency. Note that the address spaces for references 236a-236d are subsets of the address space for their respective parents. This binary tree is repeated for as many levels as desired when implementing the invention.

Figure 2C:
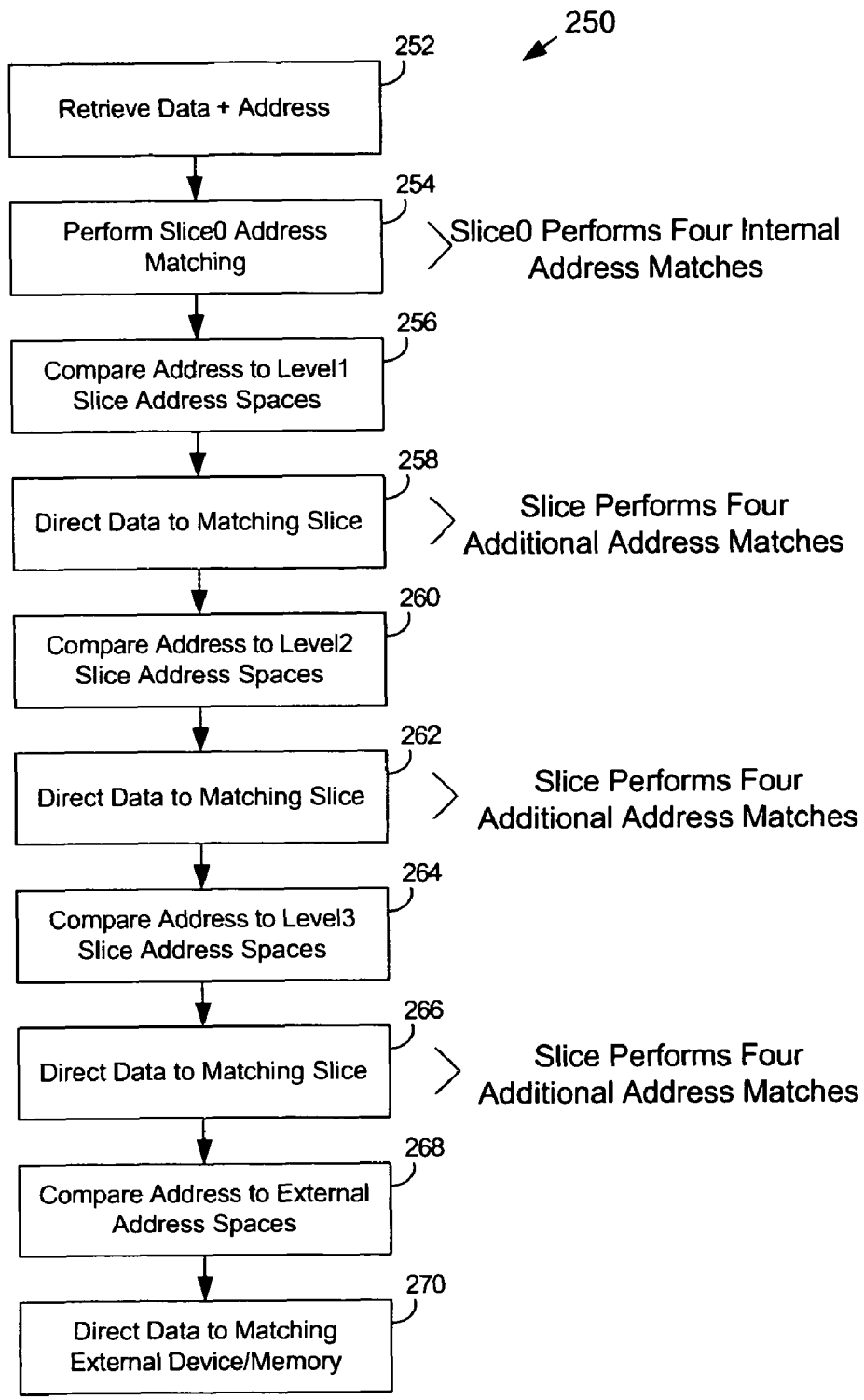

Referring to FIG. 2C, a flowchart with reference to FIG. 1 is useful for describing the functions. In step 252, a piece of data having an associated address is retrieved. Step 254 performs four address matches in Level0 (110a). Once Level0 is finished with the data, step 256 utilizes the controller 140 to decide where to forward the data based on the data address and the address spaces associated with the next level for the appropriate slice (112a-112e). Step 258, in Level1, then performs four additional address matches, similar to those performed in Level0 and step 260 forwards the data to the next level for continued processing. These steps continue as shown until the data is delivered to an external device/memory in step 270.

C. Memory Organization

Figure 3:
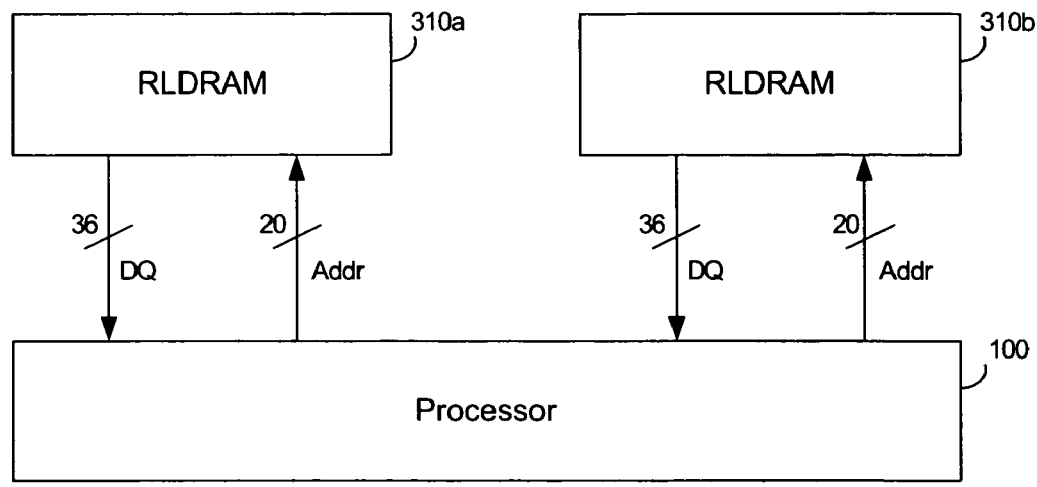
FIG. 3 depicts an embodiment using an external memory.
Figure 4:
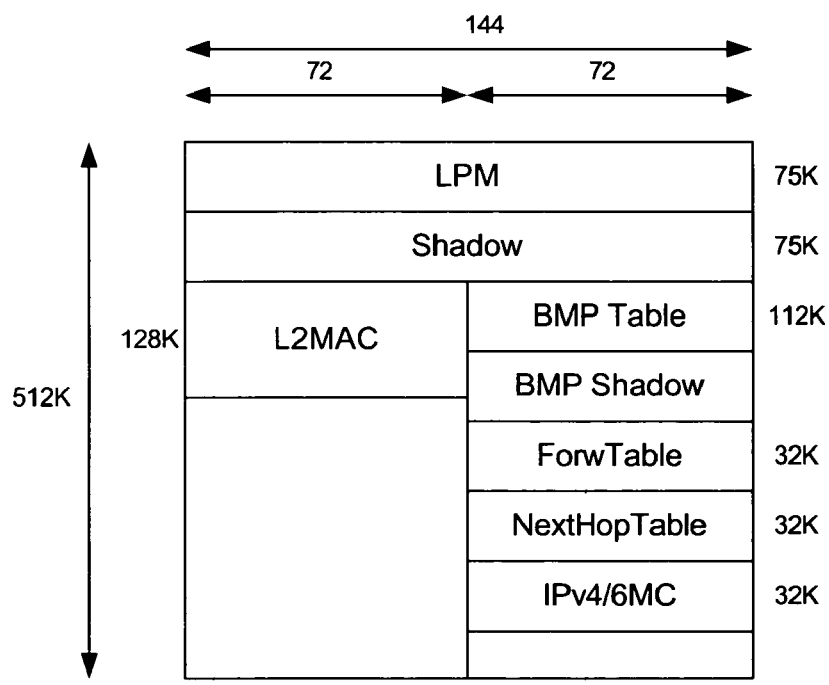
FIG. 4 depicts an embodiment detailing memory organization.

As described above, the first four levels are performed using internal memories resident in the levels (110a-110d). However, there are additional techniques that can be implemented with the invention. For example, FIG. 3 depicts the processor 100 coupled to external memories 310a-310b. The result of the internal search is to generate an address into the external memory. Two RLDRAMS (310a-310b) running at 400 MHz are used for external memory. The fifth slice in the internal memory is used as a shadow slice that can be reprogrammed on the fly for new updates or configurations. FIG. 4 depicts an embodiment detailing external memory organization. One aspect of the invention is advantageous since it provides the ability to extend the search to external memory thereby increasing the number of stored addresses.

D. Conclusion

Advantages of the invention include fast switch decisions and low switch latency.

Having disclosed exemplary embodiments and the best mode, modifications and variations may be made to the disclosed embodiments while remaining within the subject and spirit of the invention as defined by the following claims.

The invention claimed is:

1. A method of directing information to a destination level based at least in part on a memory storing address ranges, comprising:

using a network routing or switching device that comprises the memory and a controller and is configured for performing a process comprising:

storing a piece of data including a data address;

reading the data address and comparing the data address to the address ranges; and directing the piece of data to a next level associated with a unique address space associated with the data address, wherein the act of directing the piece of data to the next level comprises storing address spaces in a plurality of active slices that include predetermined address spaces representing address relationships of an index, the index allows inferring the next level from a current level without requiring to store the index in a volatile memory, the process infers the next level by using a map or an equation rather than using the index, and a shadow slice is utilized by exchanging the shadow slice with one of the plurality of active slices, whereupon the one of the plurality of active slices becomes the shadow slice upon exchange, in which the shadow slice is characterized by being programmed to comprise a recalculated database to capture an insertion or deletion operation on an original database residing in the one or more active slices.

2. The method of claim 1, further comprising matching a prefix of the data address to a plurality of addresses associated with the unique address spaces.

3. The method of claim 1, further comprising identifying a map that represents the index.

4. The method of claim 1, further comprising identifying an equation that represents the index.

5. The method of claim 1, wherein the utilizing includes reprogramming the shadow slice.

6. The method of claim 5, wherein the utilizing includes exchanging the shadow slice in response to a fault with an active slice.

7. A prefix matching apparatus for directing information to a destination, comprising:
  a memory configured to store a piece of data including a data address;
  a plurality of levels, at least one of which includes a plurality of memory locations and represents a unique address space;
  a controller coupled to the memory and to the plurality of levels, and configured to read the data address and to direct the data to a next level associated with a unique address space associated with the data address;
  a plurality of slices which comprise a plurality of active slices, each of which includes predetermined address spaces representing address relationships of an index, and a shadow slice, wherein
    the index allows the prefix matching apparatus to infer the next level from a current level without requiring to store the index in a volatile memory, and
    the controller is configured to infer the next level from the current level by using a map or an equation rather than using the index; and
  the shadow slice that is characterized by being capable of being utilized by the controller, wherein
    the shadow slice is characterized by being capable of being exchanged with one of the plurality of active slices and further by being programmed to comprise a recalculated database to capture an insertion or deletion operation on an original database residing in the one or more active slices, whereupon the one of the plurality of active slices becomes the shadow slice upon exchange.

8. The prefix matching apparatus of claim 7, wherein
  the controller is configured to match a prefix of the data address to a plurality of addresses associated with the unique address space.

9. The prefix matching apparatus of claim 7, wherein the controller comprises a map that represents the index.

10. The prefix matching apparatus of claim 7, wherein the controller comprises an equation that represents the index.

11. The prefix matching apparatus of claim 7, wherein the shadow slice can be reprogrammed.

12. The prefix matching apparatus of claim 11, wherein the shadow slice is reprogrammed simultaneously with operation of the active slices.

13. The prefix matching apparatus of claim 7, wherein the shadow slice is exchanged in response to a fault with an active slice.

14. The prefix matching apparatus of claim 7, wherein the plurality of levels support simultaneous lookup of multiple addresses.

15. The prefix matching apparatus of claim 7, further comprising:
  an external memory.

16. The prefix matching apparatus of claim 7, wherein the controller directs the data based at least in part on the index.

17. The prefix matching apparatus of claim 7, wherein the memory includes internal memory.

18. The prefix matching apparatus of claim 17, wherein the controller is further coupled to external memory separate from the internal memory.

* * * * *